US012614659B2

(12) United States Patent
Han et al.

(10) Patent No.: US 12,614,659 B2
(45) Date of Patent: Apr. 28, 2026

(54) TRANSFORMER FOR OBC OF ELECTRIC VEHICLE

(71) Applicant: ATUM CO., LTD., Gyeonggi-do (KR)

(72) Inventors: Taeksoo Han, Seoul (KR); Hyunchuel Kim, Gyeonggi-do (KR)

(73) Assignee: ATUM CO., LTD., Ansan-si (KR)

( * ) Notice: Subject to any disclaimer, the term of this patent is extended or adjusted under 35 U.S.C. 154(b) by 681 days.

(21) Appl. No.: 18/094,504

(22) Filed: Jan. 9, 2023

(65) Prior Publication Data

US 2023/0238169 A1 Jul. 27, 2023

(30) Foreign Application Priority Data

Jan. 24, 2022 (KR) ........................ 10-2022-0009958

(51) Int. Cl.
| | |
|---|---|
| *H01F 27/28* | (2006.01) |
| *H01F 27/02* | (2006.01) |
| *H01F 27/24* | (2006.01) |
| *H01F 27/32* | (2006.01) |
| *H02J 7/00* | (2026.01) |

(52) U.S. Cl.
CPC ......... *H01F 27/2823* (2013.01); *H01F 27/02* (2013.01); *H01F 27/24* (2013.01); *H01F 27/32* (2013.01); *H02J 7/0042* (2013.01)

(58) Field of Classification Search
CPC .... H02J 7/0042; H01F 27/2823; H01F 27/02; H01F 27/24; H01F 27/32; H01F 27/2871;

H01F 27/306; H01F 27/323; H01F 27/022; H01F 27/29; H01F 27/324; H01F 27/303; H01F 27/34; H01F 27/36; H01F 27/2852; H01F 27/30; H01F 5/04; B60L 53/30; B60L 53/22
See application file for complete search history.

(56) References Cited

FOREIGN PATENT DOCUMENTS

| | | | | |
|---|---|---|---|---|
| JP | 2020043213 A | * | 3/2020 | |
| KR | 20160122919 A | * | 10/2016 | ........... H01F 27/324 |
| KR | 20170112160 A | * | 10/2017 | ........... B60L 11/005 |

OTHER PUBLICATIONS

Machine translation of JP-2020043213-A (Year: 2025).*
Machine translation of KR-20170112160-A (Year: 2025).*

* cited by examiner

*Primary Examiner* — David V Henze-Gongola
(74) *Attorney, Agent, or Firm* — NKL LAW; Jae Youn Kim

(57) ABSTRACT

A transformer for an OBC of an electric vehicle includes: a housing; a cover for opening and closing a storage space of the housing; a plate-type primary coil embedded in the storage space of the housing and supplied with power from a charger side; and a plurality of plate-shaped secondary coils embedded in the storage space of the housing to independently generate an induced current by magnetic field induction from the primary coil and output the induced current to a high voltage battery, and according to this, there is an advantage of reducing the size and improving the product productivity.

7 Claims, 5 Drawing Sheets

100

TRANSFORMER FOR OBC OF ELECTRIC VEHICLE

BACKGROUND

The present invention relates to an on-board charger (OBC) of an electric vehicle.

An electric vehicle (EV) including a plug-in hybrid vehicle (PHEV), and this is the same throughout the specification is provided with an On-Board Charger (OBC) for charging a high voltage battery that drives the motor of the vehicle with 200V AC supplied from a charger, the high voltage battery charged with power converted by the OBC, a low DC-DC converter (LDC) for converting a high voltage of the high voltage battery into a low voltage of 12V and supplying power to electric components of the vehicle.

In addition, the OBC embedded in the electric vehicle is configured to include: a first converter for full-wave rectifying 220V AC supplied from the charger through a bridge diode, and boosting the rectified voltage through a boost converter circuit; a second converter for converting the rectified voltage output from the first converter into a high-frequency AC voltage through a full bridge circuit; a transformer for transforming the high-frequency AC voltage output from the second converter into a high voltage and physically insulating between the 220V AC and the high voltage battery; and a rectifying unit for converting the high-frequency high-voltage AC voltage transformed by the transformer into a DC voltage by rectifying and filtering the AC voltage, and supplying the DC voltage to the high voltage battery.

In the OBC transformer according to the prior art, a primary coil is wound around a specially manufactured bobbin and an insulation tape wraps around the wound primary coil to insulate. Then, a secondary coil is wound around the insulation tape wrapping the primary coil, and the insulation tape is wrapped again around the wound secondary coil to insulate.

In addition, when the work of winding the secondary coil is performed three times, it is insulated by wrapping the insulation tape from time to time whenever the secondary coil is wound.

However, the transformer for an OBC of an electric vehicle according to the prior art as described above has a considerably large product size.

Since the secondary coil is coaxially wound around the primary coil wound around the bobbin, there is a problem of increasing the diameter and size of a product, and this leads to a problem of increasing the size of the OBC.

In addition, since an assembly process of winding a primary coil, winding an insulation tape around the primary coil to insulate, winding a secondary coil thereon, and winding an insulation tape around the secondary coil is repeated, the assembly process increases, and thus there is a disadvantage in that the productivity is significantly lowered.

SUMMARY OF THE INVENTION

Therefore, the present invention has been made in view of the above problems, and it is an object of the present invention to provide a transformer for an OBC of an electric vehicle, which is suitable for first, reducing the height and size of a product of the OBC transformer by configuring both the primary coil and the secondary coil of the OBC transformer in a plate shape, and storing the primary coil and the secondary coil in one housing; second, improving efficiency by reducing the loss between the primary coil and the secondary coil in the OBC of the electric vehicle; third, supplying high current and high voltage with a small size; fourth, increasing adhesiveness of the primary coil and the secondary coil themselves of the OBC transformer as the primary coil and the secondary coil themselves of the OBC transformer are formed by fusing, reducing loss and improving efficiency by also increasing adhesiveness between the primary coil and the secondary coil, further reducing the height of a product, and at the same time, further reducing the size of the product; fifth, improving product competitiveness of the OBC in the electric vehicle as the size of the OBC itself can be reduced, and therefore, the space occupied in the electric vehicle is reduced and the weight is also lowered; sixth, reducing the assembly process (50% of the assembly process is reduced compared to the production process of conventional OBC transformers), significantly improving productivity, and increasing price competitiveness, as the production itself of the primary coil and the secondary coil of the OBC transformer is performed by a winding jig, and production of the primary coil and the secondary coil of the OBC transformer is automated; seventh, improving EMI performance; eighth, performing the work of assembling the primary coil and the secondary coil very easily, conveniently, and accurately, and in addition, omitting a separate terminal alignment (wiring) work (wiring work) of the primary coil and the secondary coil, as the primary coil and the secondary coil only need to go down from the top to the bottom along the primary side outlet slits and the secondary side outlet slits to be assembled; ninth, easily, conveniently, and firmly fastening the cover to the housing with a simple configuration; tenth, quickly and accurately wiring the OBC transformer without erroneous wiring in a wiring work although a worker is unskilled; eleventh, accurately, conveniently, and quickly performing the work of assembling the cover down to the housing, and preventing foreign matters from flowing into the housing; twelfth, reducing material costs and improving durability of the product, as the strength of the cover can be maintained although the cover is thin; thirteenth, easily, conveniently, and accurately performing the work of aligning the primary coil and the secondary coil stacked in the vertical direction in the longitudinal direction, while insulating between the primary coil and the secondary coil or between the secondary coil and the secondary coil; fourteenth, performing a work of wiring the transformer 100 with other components in the OBC more easily and conveniently; fifteenth, exhibiting performance of high current and high voltage with optimal thickness and an optimal number of copper fine lines; sixteenth, preventing occurrence of looseness or a gap between the primary coil and the secondary coil themselves although there is continuous vibration during the operation of the electric vehicle; and in addition, preventing occurrence of looseness or a gap between the primary coil and the secondary coil, and protecting from the risk of fire.

To accomplish the above object, according to one aspect of the present invention, there is provided a transformer for an OBC of an electric vehicle, in an OBC of an electric vehicle for charging a high voltage battery of the electric vehicle with commercial AC power supplied from a charger of the electric vehicle, the transformer comprising: a housing having a storage space Sa formed therein; a cover for opening and closing the storage space of the housing; a plate-type primary coil embedded in the storage space of the housing and supplied with power from the charger of the electric vehicle; a plurality of plate-shaped secondary coils embedded in the storage space Sa of the housing to independently generate induced current by magnetic field induction from the primary coil and output the induced current to the high voltage battery; an upper magnetic core provided to surround the outer surface of the housing 110 on the top side of the cover; and a lower magnetic core provided to surround the housing 110 on the bottom side of the housing.

DETAILED DESCRIPTION OF THE PREFERRED EMBODIMENT

Figure 1:
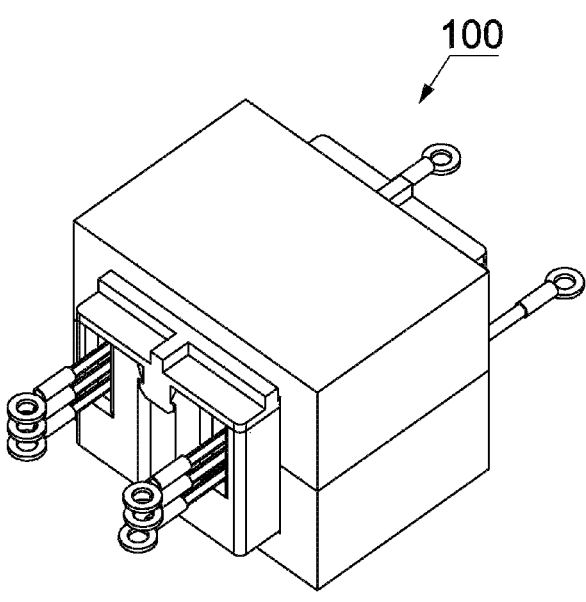
FIG. 1 is a perspective view showing a transformer 100 for an OBC of an electric vehicle according to an embodiment of the present invention.
Figure 2:
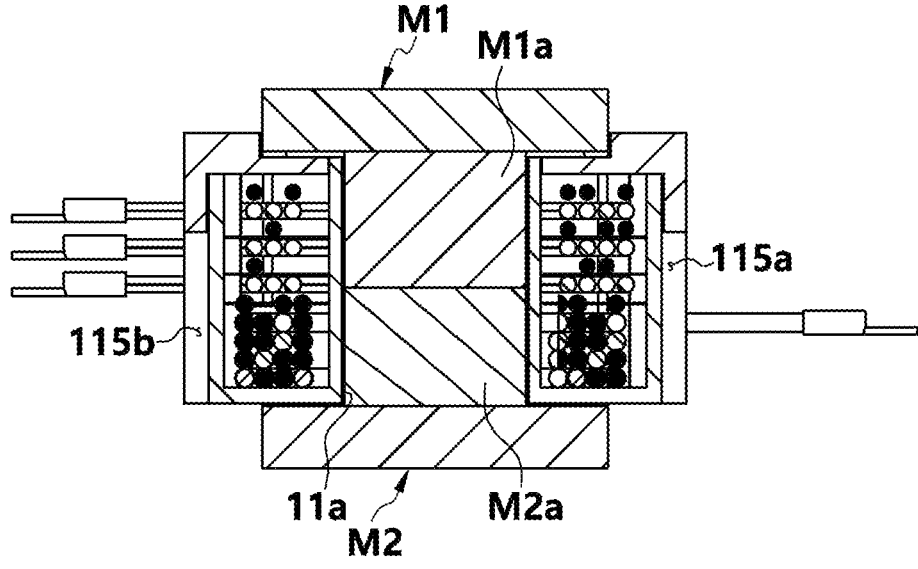
FIG. 2 is a cross-sectional view of FIG. 1.
Figure 3:
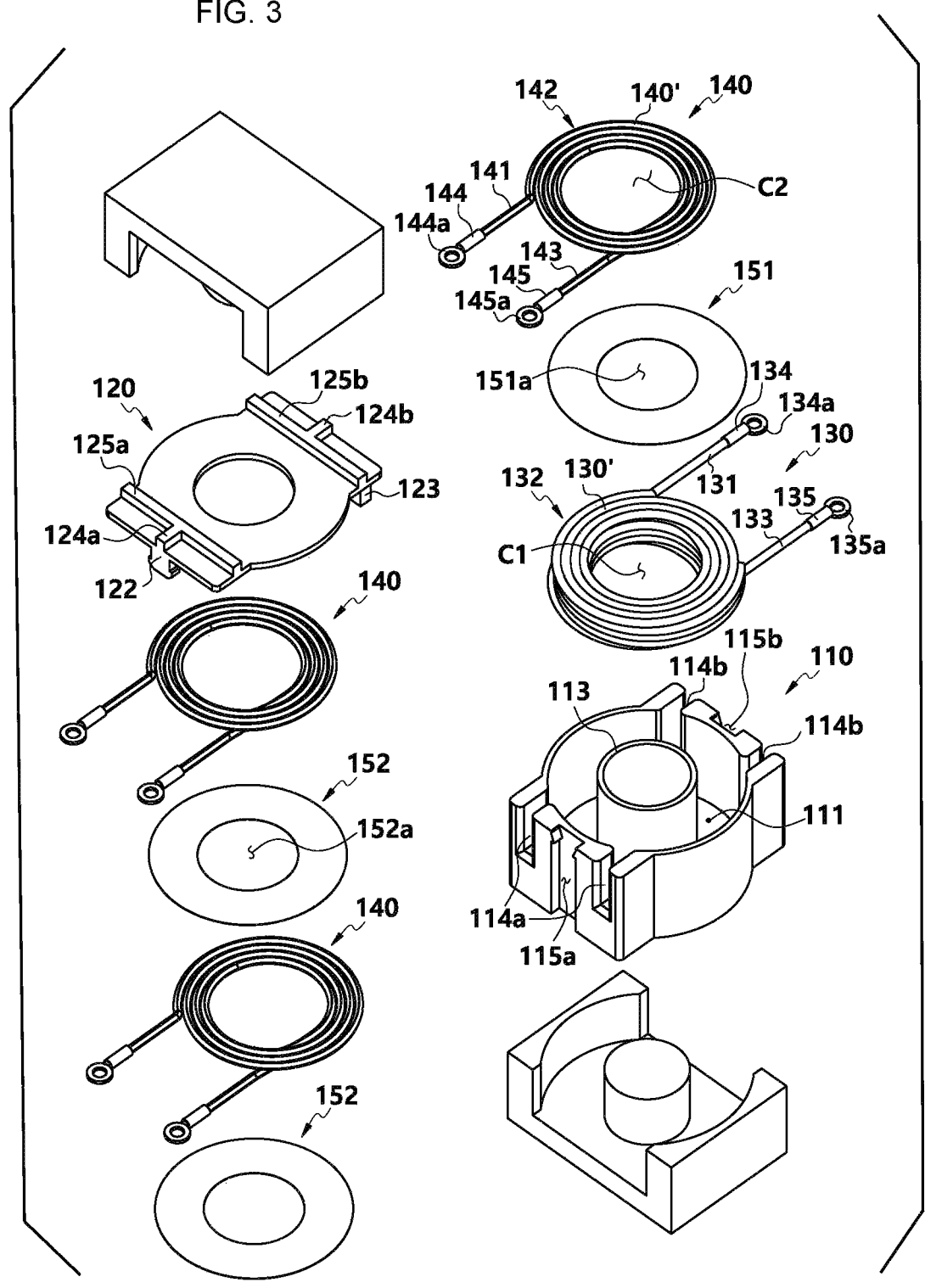
FIG. 3 is an exploded perspective view of FIG. 1.
Figure 4A:
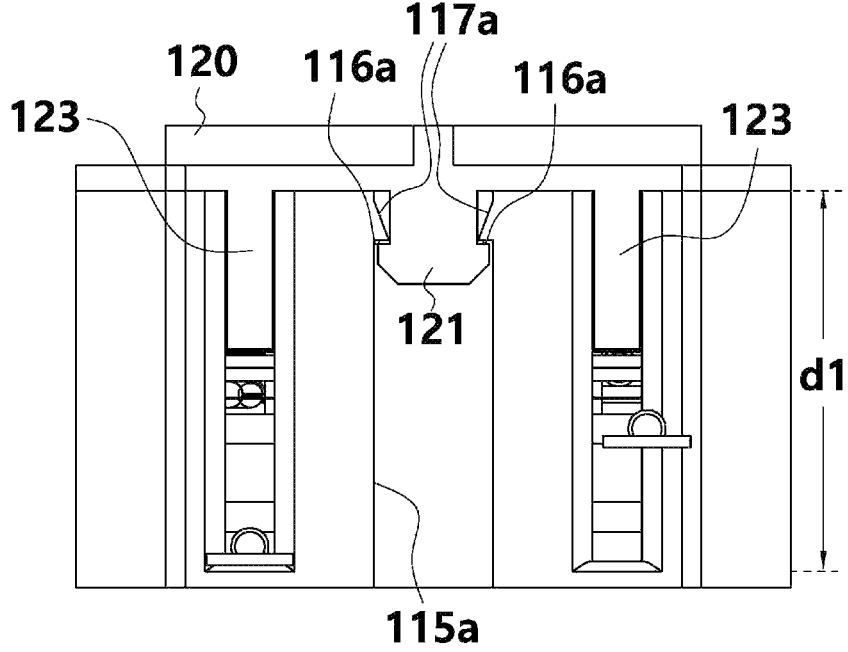
FIG. 4A is a right-side view showing a state in which magnetic cores M1 and M2 are excluded in a transformer 100 for an OBC of an electric vehicle according to an embodiment of the present invention.
Figure 4B:
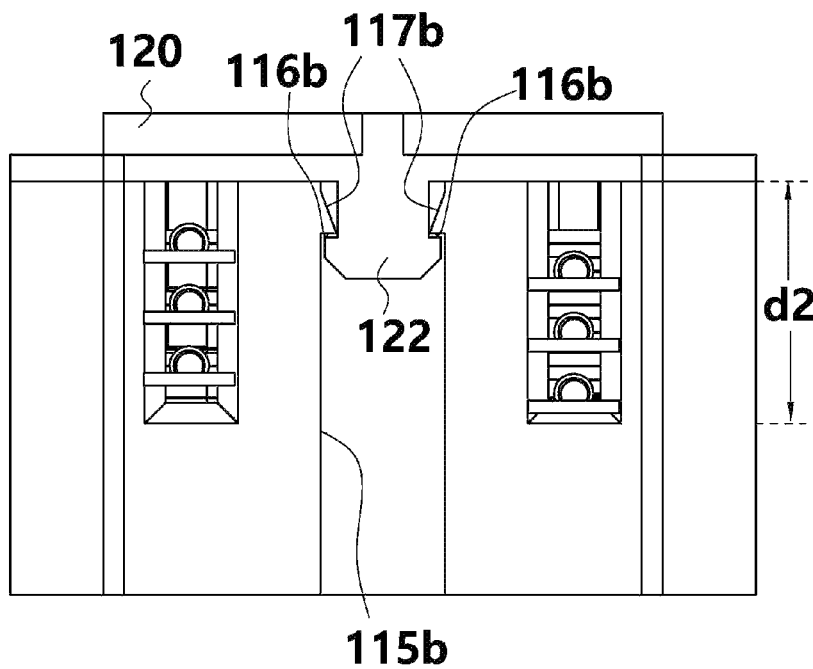
FIG. 4B is a left-side view showing a state in which magnetic cores M1 and M2 are excluded in a transformer 100 for an OBC of an electric vehicle according to an embodiment of the present invention.

Hereinafter, a preferred embodiment of a transformer for an OBC of an electric vehicle according to the present invention will be described in detail with reference to the accompanying drawings.

In an OBC of an electric vehicle for charging a high voltage battery of the electric vehicle with commercial AC power (220V AC) supplied from a charger of the electric vehicle, specifically, in an OBC of an electric vehicle or a hybrid vehicle for charging a high voltage battery with commercial AC power, which is configured to include a first converter for full-wave rectifying 220V AC through a bridge diode, and boosting the rectified voltage through a boost converter circuit, a second converter for converting the rectified voltage output from the first converter into a high-frequency AC voltage through a full bridge circuit, a transformer 100 for transforming the high-frequency AC voltage output from the second converter into a high voltage and physically insulating between the 220V AC and the high voltage battery, and a rectifying unit for converting the high-frequency high-voltage AC voltage transformed by the transformer into a DC voltage by rectifying and filtering the AC voltage, and supplying the DC voltage to the high voltage battery, the transformer 100 for an OBC of an electric vehicle according to an embodiment of the present invention is configured to include: a housing 110 having a storage space Sa formed therein; a cover 120 for opening and closing the storage space Sa of the housing 110; a plate-type primary coil 130 embedded in the storage space Sa of the housing 110 and supplied with power from the charger of the electric vehicle; a plurality of plate-shaped secondary coils 140 embedded in the storage space Sa of the housing 110 to independently generate induced current by magnetic field induction from the primary coil 130 and output the induced current to the high voltage battery; an upper magnetic core M1 provided to surround the outer surface of the housing 110 on the top side of the cover 120; and a lower magnetic core M2 provided to surround the housing 110 on the bottom side of the housing 110.

According to this, as both the primary coil 130 and the secondary coil 140 of the OBC transformer are configured in a plate shape and stored in one housing, the height and size of a product of the OBC transformer may be reduced.

In addition, efficiency may be improved by reducing the loss between the primary coil and the secondary coil in the OBC of the electric vehicle.

In the OBC transformer 100 of an electric vehicle according to an embodiment of the present invention, the primary coil 130 is formed of a first conductive wire 130' and is configured of a straight first input wire unit 131 formed of a first conductive wire 130' to be connected to the charger side of the electric vehicle specifically, the second converter of the OBC, a primary side winding unit 132 formed to be extended from the first input wire unit 131 and winding the first conductive wire 130' a plurality of times in a plate shape to form a first central hole C1 at the center, and a straight first output wire unit 133 formed of a first conductive wire 130' to be connected to the charger side of the electric vehicle at an end of the primary side winding unit 132.

In addition, in the primary side winding unit 132, the first conductive wire 130' is coated with an insulative coalescing agent (e.g., polyamide material), and the first conductive wire 130' wound in a plate shape is adhered to each other by the coated coalescing agent.

The primary side winding unit 132 is formed in a hard state in which the first conductive wire 130' is adhered to and aligned with each other at the same time by fusion bonding (without having uneven outer surfaces) by coating the first conductive wire 130' with an insulative coalescing agent (the coalescing agent itself is an insulating material) according to embodiments, the first conductive wire 130' may be first coated with an insulating material for insulation before coating the coalescing agent, and then coated with the coalescing agent, automatically winding the first conductive wire 130' coated with the coalescing agent in a plate shape by a winding jig so that the first conductive wire 130' may be aligned in a horizontal direction and/or vertical direction while being tightly attached to each other, and then melting the coated insulative coalescing agent with a solvent (e.g., alcohol) or by applying heat, and curing it.

In addition, the secondary coil 140 is formed of a second conductive wire 140' and is configured of a straight second input wire unit 141 formed of a second conductive wire 140' to be connected to the charger side of the electric vehicle specifically, the second converter of the OBC, a secondary side winding unit 142 formed to be extended from the second input wire unit 141 and winding the second conductive wire 140' a plurality of times in a plate shape to form a second central hole C1 at the center, and a straight second output wire unit 143 formed of a second conductive wire 140' to be connected to the charger side of the electric vehicle at an end of the secondary side winding unit 142.

In addition, in the secondary side winding unit 142, the second conductive wire 140' is coated with an insulative coalescing agent (e.g., polyamide material), and the second conductive wire 140' wound in a plate shape is adhered to each other by the coated coalescing agent.

The secondary side winding unit 142 is formed in a hard state in which the second conductive wire 140' is adhered to and aligned with each other at the same time by fusion bonding (without having uneven outer surfaces) by coating the second conductive wire 140' with an insulative coalescing agent (the coalescing agent itself is an insulating material) according to embodiments, the second conductive wire 140' may be first coated with an insulating material for insulation before coating the coalescing agent, and then coated with the coalescing agent, automatically winding the second conductive wire 140' coated with the coalescing agent in a plate shape by a winding jig so that the second conductive wire 140' may be aligned in a horizontal direction and/or vertical direction while being tightly attached to each other, and then melting the coated insulative coalescing agent with a solvent (e.g., alcohol) or by applying heat, and curing it.

According to the specific configuration of the primary coil 130 and the secondary coil 140 as described above, high current and high voltage may be supplied with a small size.

In addition, since the adhesiveness of the primary coil 130 and the secondary coil 140 themselves of the OBC transformer is increased as the primary coil 130 and the secondary coil 140 themselves of the OBC transformer are formed by fusing, and the adhesiveness between the primary coil 130 and the secondary coil 140 is also increased as described above, loss is reduced, and efficiency is further improved. In addition, the height of a product may be further reduced (70% lower than a conventional OBC transformer), and at the same time, the size of the product may be further reduced (70% smaller than the conventional OBC transformer).

In addition, since the height of the OBC transformer is reduced and the size of the product is reduced, the size of the OBC itself can be reduced, and therefore, as the space occupied in the electric vehicle is reduced and the weight is also lowered, product competitiveness of the OBC in the electric vehicle is improved.

In addition, since the production itself of the primary coil 130 and the secondary coil 140 of the OBC transformer may be performed by a winding jig as described above, production of the primary coil 130 and the secondary coil 140 of the OBC transformer may be automated, and therefore, the assembly process is reduced (50% of the assembly process is reduced compared to the production process of conventional OBC transformers), and productivity can be significantly improved, and accordingly, price competitiveness is improved.

Figure 5:
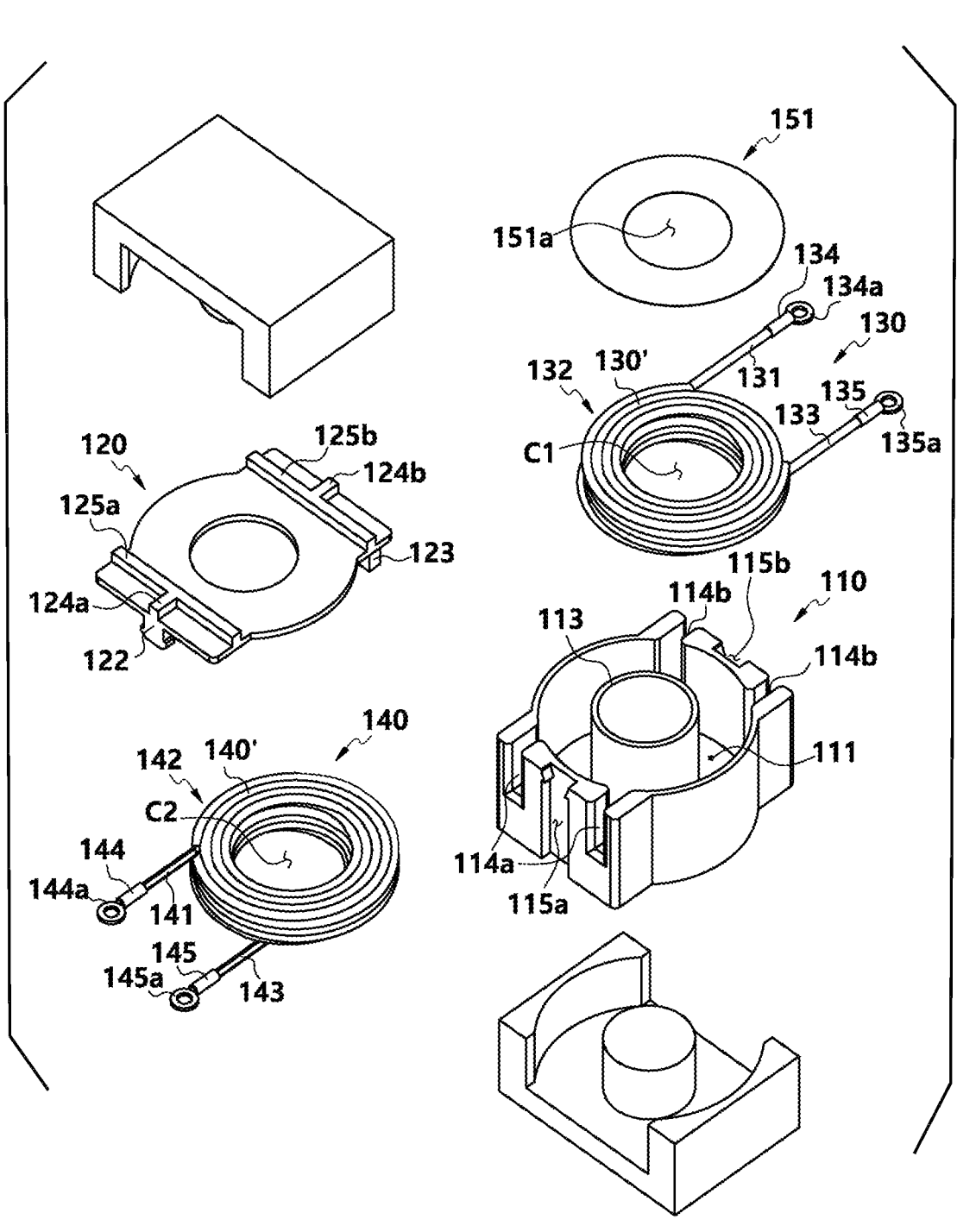
FIG. 5 is an exploded perspective view showing an OBC transformer 100 adopting a secondary coil 140 configured as a single coil bunch, rather than being divided into a plurality of windings.
Figure 6:
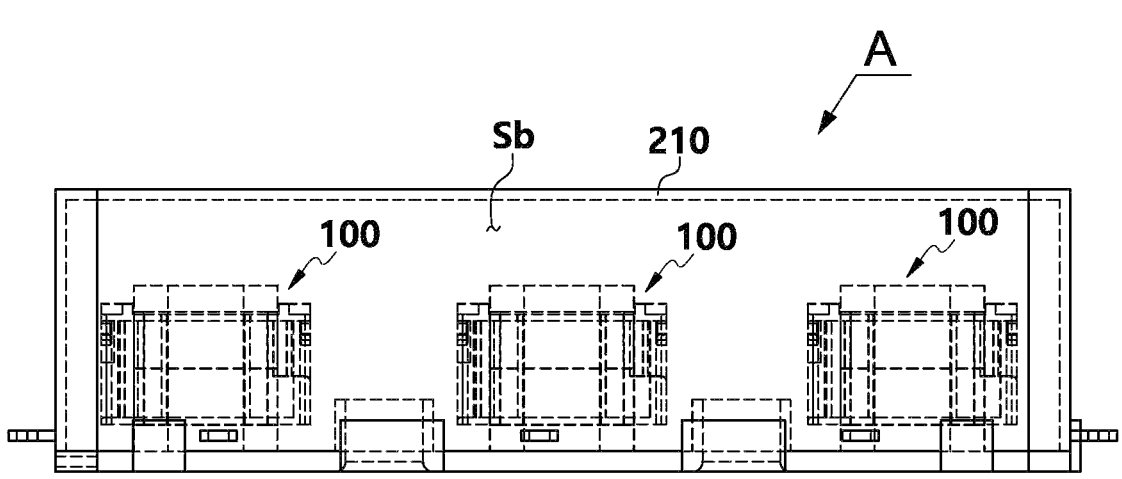
FIG. 6 is a conceptual view showing the configuration of a transformer assembly A for an OBC of an electric vehicle according to an embodiment of the present invention.

As shown in the drawing, the secondary coil 140 may be formed as a single coil bunch or as several divided windings as shown in FIG. 5, and either case belongs to the technical scope of the present invention.

According to embodiments, the first conductive wire 130' that forms the primary coil 130 is configured of a copper fine line twisted wire made by twisting several strands of copper fine lines, and is formed in a hard state in which the first conductive wire 130' is adhered to and aligned with each other at the same time by fusion bonding by coating the first conductive wire 130' formed of the copper fine line twisted wire with a coalescing agent, automatically winding the first conductive wire 130' coated with the coalescing agent in a plate shape by a winding jig so that the first conductive wire 130' may be aligned in a horizontal direction and/or vertical direction while being tightly attached to each other, and then melting the coated insulative coalescing agent with a solvent (e.g., alcohol) or by applying heat, and curing it.

In the same manner, the second conductive wire 140' that forms the secondary coil 140 is configured of a copper fine line twisted wire made by twisting several strands of copper fine lines, and is formed in a hard state in which the second conductive wire 140' is adhered to and aligned with each other at the same time by fusion bonding by coating the second conductive wire 140' formed of the copper fine line twisted wire with a coalescing agent, automatically winding the second conductive wire 140' coated with the coalescing agent in a plate shape by a winding jig so that the second conductive wire 140' may be aligned in a horizontal direction and/or vertical direction while being tightly attached to each other, and then melting the coated insulative coalescing agent with a solvent (e.g., alcohol) or by applying heat, and curing it.

According to another embodiment, a heat-resistant tape (not shown) wraps around the first conductive wire 130' that forms the primary coil 130 (in this embodiment, of course, the outer skin of the first conductive wire 130' is not coated with a coalescing agent), a coalescing agent (e.g., polyamide material) is coated on the heat-resistant tape wrapping the first conductive wire 130', and the first conductive wire 130' of the primary side winding unit 132 wound in a plate shape is adhered to each other by the coalescing agent coated on the heat-resistant tape.

Specifically, the primary side winding unit 132 is formed in a hard state in which the first conductive wire 130' wrapped around by the heat-resistant tape is adhered to and aligned with each other at the same time by fusion bonding by coating the heat-resistant tape wrapping the first conductive wire 130' with a coalescing agent, automatically winding the first conductive wire 130' wrapped around by the heat-resistant tape coated with the coalescing agent in a plate shape by a winding jig so that the first conductive wire 130' may be aligned in a horizontal direction and/or vertical direction while being tightly attached to each other, and then melting the coalescing agent coated on the heat-resistant tape with a solvent (e.g., alcohol) or by applying heat, and curing it.

According to still another embodiment, the first conductive wire 130' that forms the primary coil 130 is configured of a copper fine line twisted wire made by twisting several strands of copper fine lines, a heat-resistant tape (not shown) wraps around the first conductive wire 130' formed of the copper fine line twisted wire, a coalescing agent (e.g., polyamide material) is coated on the heat-resistant tape wrapping the first conductive wire 130', and the first conductive wire 130' wrapped around by the heat-resistant tape and wound in a plate shape is adhered to each other by the coalescing agent.

Specifically, the primary side winding unit 132 is formed in a hard state in which the first conductive wire 130' wrapped around by the heat-resistant tape is adhered to and aligned with each other at the same time by fusion bonding by coating the heat-resistant tape wrapping the first conductive wire 130' configured of the copper fine line twisted wire with a coalescing agent, automatically winding the first conductive wire 130' wrapped around by the heat-resistant tape coated with the coalescing agent in a plate shape by a winding jig so that the first conductive wire 130' may be aligned in a horizontal direction and/or vertical direction while being tightly attached to each other, and then melting the coalescing agent coated on the heat-resistant tape with a solvent (e.g., alcohol) or by applying heat, and curing it.

In the same manner, a heat-resistant tape (not shown) wraps around the second conductive wire 140' that forms the secondary coil 140 (in this embodiment, of course, the outer skin of the second conductive wire 140' is not coated with a coalescing agent), a coalescing agent (e.g., polyamide material) is coated on the heat-resistant tape wrapping the second conductive wire 140', and the second conductive wire 140' of the secondary side winding unit 142 wound in a plate shape is adhered to each other by the coalescing agent coated on the heat-resistant tape.

Specifically, the secondary side winding unit 142 is formed in a hard state in which the second conductive wire 140' wrapped around by the heat-resistant tape is adhered to and aligned with each other at the same time by fusion bonding by coating the heat-resistant tape wrapping the second conductive wire 140' with a coalescing agent, automatically winding the second conductive wire 140' wrapped around by the heat-resistant tape coated with the coalescing agent in a plate shape by a winding jig so that the second conductive wire 140' may be aligned in a horizontal direction and/or vertical direction while being tightly attached to each other, and then melting the coalescing agent coated on the heat-resistant tape with a solvent (e.g., alcohol) or by applying heat, and curing it.

According to still another embodiment, the second conductive wire 140' that forms the secondary coil 140 is configured of a copper fine line twisted wire made by twisting several strands of copper fine lines, a heat-resistant tape (not shown) wraps around the second conductive wire 140' formed of the copper fine line twisted wire, a coalescing agent (e.g., polyamide material) is coated on the heat-resistant tape wrapping the second conductive wire 140', and the second conductive wire 140' wrapped around by the heat-resistant tape and wound in a plate shape is adhered to each other by the coalescing agent.

Specifically, the secondary side winding unit 142 is formed in a hard state in which the second conductive wire 140' wrapped around by the heat-resistant tape is adhered to and aligned with each other at the same time by fusion bonding by coating the heat-resistant tape wrapping the second conductive wire 140' configured of the copper fine line twisted wire with a coalescing agent, automatically winding the second conductive wire 140' wrapped around by the heat-resistant tape coated with the coalescing agent in a plate shape by a winding jig so that the second conductive wire 140' may be aligned in a horizontal direction and/or vertical direction while being tightly attached to each other, and then melting the coalescing agent coated on the heat-resistant tape with a solvent (e.g., alcohol) or by applying heat, and curing it.

The copper fine line twisted wire may be configured of Litz wire or USTC wire.

The heat-resistant tape has insulating properties. The heat-resistant tape may be configured of Kapton tape.

In the transformer 100 for an OBC of an electric vehicle according to an embodiment of the present invention, the primary coil 130 is wound so that both the first input wire unit 131 and the first output wire unit 133 are disposed in the same direction toward the charger side of the electric vehicle, and the secondary coil 140 is wound so that both the second input wire unit 141 and the second output wire unit 143 are disposed in the same direction.

The housing 110 is configured to include a bottom unit 111 of a plate shape, a circumference unit 112 formed upright from the bottom unit 111 toward the top, and an insertion tube 113 formed to protrude upward from the bottom unit 111, and the storage space Sa is formed by the space between the insertion tube 113 and the circumference unit 112, a pair of primary side outlet slits 114a having an open top while being recessed downward are formed on the right side of the circumference unit 112 to have an interval, and a pair of secondary side outlet slits 114b having an open top while being recessed downward are formed on the left side of the circumference unit 112 to have an interval.

The primary coil 130 is provided as the first central hole C1 is inserted outside the insertion tube 113 while the primary side winding unit 132 descends from the top to the bottom and is inserted between the circumference unit 112 and the insertion tube 113, and at the same time, the pair of the first input wire unit 131 and the first output wire unit 133 also descend together with the primary side winding unit 132 to be inserted into the primary side outlet slits 114a from the top to the bottom. The secondary coil 140 is provided as the second central hole C2 is inserted outside the insertion tube 113 while the secondary side winding unit 142 descends from the top to the bottom and is inserted between the circumference unit 112 and the insertion tube 113, and at the same time, the pair of the second input wire unit 141 and the second output wire unit 143 also descend together with the secondary side winding unit 142 to be inserted into the secondary side outlet slits 114b from the top to the bottom.

Since the primary coil 130 and the secondary coil 140 only need to be inserted while going down from the top to the bottom along the primary side outlet slits 114a and the secondary side outlet slits 114b as described above, the primary coil 130 and the secondary coil 140 may be inserted into the housing 110 very easily, conveniently, and accurately, and in addition, since separate terminal alignment (wiring) work (wiring work) of the primary coil 130 and the secondary coil 140 is not required, assembly workability is further improved.

A first guide channel 115a formed on the left side of the circumference unit 112 between the pair of primary side outlet slits 114a, to be recessed in the direction toward the center where the coil is located, a second guide channel 115b formed on the right side of the circumference unit 112 between the pair of secondary side outlet slits 114b, to be recessed in the direction toward the center where the coil is located, a first latching step 116a formed in the first guide channel 115a to protrude toward the inside, a second latching step 116b formed in the second guide channel 115b to protrude toward the inside, a first hook 121 formed at the left end of the cover 120 to be perpendicular downward and hooked with the first latching step 116a while descending along the first guide channel 115a, and a second hook 122 formed at the right end of the cover 120 to be perpendicular downward and hooked with the second latching step 116b while descending along the second guide channel 115b are provided.

According to this, the cover 120 may be easily, conveniently, and firmly fastened to the housing 110 with a simple configuration.

A first guide slope surface 117a formed in the first guide channel 115a above the first latching step 116a to be inclined to decrease the width from the top toward the bottom so that the first hook 121 may be smoothly hooked with the first latching step 116a, and a second guide slope surface 117b formed in the second guide channel 115b above the second latching step 116b to be inclined to decrease the width from the top toward the bottom so that the second hook 122 may be smoothly hooked with the second latching step 116b are further provided.

According to this, the cover 120 may be further easily, conveniently, and smoothly fastened to the housing 110.

The primary coil 130 is provided below the secondary coil 140, and the depth d1 of the primary side outlet slit 114a is formed to be greater than the depth d2 of the secondary side outlet slit 114b, and as the depth d1 of the primary side outlet slit 114a is formed to be greater than the depth d2 of the secondary side outlet slit 114b, the primary side and the secondary side of the transformer can be identified.

According to this, even an unskilled worker may quickly and accurately wire the OBC transformer 100 without erroneous wiring in a wiring work, thus productivity is increased.

A shield bar 123 formed at the left end of the cover 120 to be perpendicular downward in correspondence to the pair of primary side outlet slits 114a is provided to guide fastening while descending along the primary side outlet slits 114a as the cover 120 descends to the housing 110, and at the same time, block foreign matters from flowing into the primary side outlet slits 114a when the cover 120 is fastened to the housing 110.

According to this, the work of assembling the cover 120 down to the housing 110 can be performed accurately, conveniently, and quickly, and foreign matters can be prevented from flowing into the housing.

A first reinforcing rib 124a formed to protrude from the top surface of the cover 120 so as to be located directly above the first hook 121 when the cover 120 is fastened to the housing 110 to prevent the first hook 121 from being broken when the cover 120 is fastened to the housing 110, and a second reinforcing rib 124b formed to protrude from the top surface of the cover 120 so as to be located directly above the second hook 122 when the cover 120 is fastened to the housing 110 to prevent the second hook 122 from being broken when the cover 120 is fastened to the housing 110 are provided.

A first twist blocking rib 125a formed on the top surface of the cover 120 in a bar shape in the front and rear direction to intersect in a T shape at an end of the first reinforcing rib 124a to prevent twist of the cover 120 when the upper magnetic core M1 is inserted into the insertion tube 113, and a second twist blocking rib 125b formed on the top surface of the cover 120 in a bar shape in the front and rear direction to intersect in a T shape at an end of the second reinforcing rib 124b to prevent twist of the cover 120 when the upper magnetic core M1 is inserted into the insertion tube 113 are provided.

According to this, since strength of the cover can be maintained although the cover is thin, material costs can be reduced, and durability of the product can be improved.

A first adhesive sheet 151 having a first through hole 151a formed at the center to be inserted outside the insertion tube 113, and interposed between the primary coil 130 and the secondary coil 140, which is provided closest to the primary coil 130, to insulate between the primary coil 130 and the secondary coil 140 and adhere the primary coil 130 and the secondary coil 140 at the same time, and at least one second adhesive sheet 152 having a second through hole 152a formed at the center to be inserted outside the insertion tube 113 to insulate a plurality of secondary coils 140 from each other and adhere the secondary coils 140 at the same time are provided.

According to this, the work of aligning the primary coil 130 and the secondary coil 140 stacked in the vertical direction (height direction) in the longitudinal direction may be performed easily, conveniently, and accurately, while the primary coil 130 and the secondary coil 140 or the secondary coil 140 and the secondary coil 140 are insulated from each other.

A bottom through hole 111a is formed at the center of the bottom unit 111, the insertion tube 113 is formed upward along the inner circumference of the bottom through hole 111a, a cover through hole 120a is formed at the center of the cover 120 to face the bottom through hole 111a, a middle leg M1a of the upper magnetic core M1 is provided to be inserted into the insertion tube 113 through the cover through hole 120a, and a middle leg M2a of the lower magnetic core M2 is provided to be inserted into the insertion tube 113 through the bottom through hole 111a.

A first input terminal 134 conductively connected to an end of the first input wire unit 131 and having a first input terminal fixing hole 134a formed therein, a first output terminal 135 conductively connected to an end of the first output wire unit 133 and having a first output terminal fixing hole 135a formed therein, a second input terminal 144 conductively connected to an end of the second input wire unit 141 and having a second input terminal fixing hole 144a formed therein, and a second output terminal 145 conductively connected to an end of the second output wire unit 143 and having a second output terminal fixing hole 145a formed therein are provided.

According to this, a wiring work of the transformer 100 in the OBC may be performed more easily and conveniently.

When the first conductive wire 130' of the primary coil 130 is configured of a copper fine line twisted wire, it is formed by twisting 180 to 220 strands of copper fine lines having a diameter of 0.08 to 0.12 mm.

When the second conductive wire 140' of the secondary coil 140 is configured of a copper fine line twisted wire, it is formed by twisting 160 to 200 strands of copper fine lines having a diameter of 0.04 to 0.08 mm.

According to this, it is possible to exhibit performance of high current and high voltage with optimal thickness and an optimal number of copper fine lines.

More preferably, the copper fine line twisted wire of the first conductive wire 130' is formed by twisting 200 strands of copper fine lines having a diameter of 0.1 mm, and the copper fine line twisted wire of the second conductive wire 140' is formed by twisting 180 strands of copper fine lines having a diameter of 0.06 mm.

Next, a transformer assembly A for an OBC of an electric vehicle according to an embodiment of the present invention will be described.

A transformer assembly A for an OBC of an electric vehicle according to an embodiment of the present invention is configured to include an OBC transformer 100 of the electric vehicle, an internal space Sb formed to include the OBC transformer 100, and a metallic heat dissipation casing 210 for dissipating heat generated by the OBC transformer 100, and the OBC transformer 100 is provided in plurality (three in the illustrated example).

A plurality of OBC transformers 100 embedded in the heat dissipation casing 210 is connected in parallel.

An insulating liquid having thermal conductivity is filled inside the heat dissipation casing 210.

The OBC transformer of the present invention having the configuration as described above has the following effects.

First, as both the primary coil and the secondary coil of the OBC transformer are configured in a plate shape and stored in one housing, there is an effect of reducing the height and size of a product of the OBC transformer.

Second, there is an effect of improving efficiency by reducing the loss between the primary coil and the secondary coil in the OBC of the electric vehicle.

Third, there is an effect of supplying high current and high voltage with a small size.

Fourth, there is an effect of increasing adhesiveness of the primary coil and the secondary coil themselves of the OBC transformer as the primary coil and the secondary coil themselves of the OBC transformer are formed by fusing, reducing loss and improving efficiency by also increasing adhesiveness between the primary coil and the secondary coil, further reducing the height of a product, and at the same time, further reducing the size of the product.

Fifth, since it does not need to wrap with an insulation tape, there is an effect of exhibiting excellent heat generation characteristics and excellent EMI performance.

Sixth, as the size of the OBC itself can be reduced, and therefore, the space occupied in the electric vehicle is reduced and the weight is also lowered, there is an effect of improving product competitiveness of the OBC in the electric vehicle.

Seventh, as the production itself of the primary coil and the secondary coil of the OBC transformer is performed by a winding jig, and production of the primary coil and the secondary coil of the OBC transformer is automated, the assembly process may be reduced (50% of the assembly process is reduced compared to the production process of conventional OBC transformers), and productivity can be improved significantly, and as a result thereof, there is an effect of increasing price competitiveness.

Eighth, since it does not need to wrap with an insulation tape, there is an effect of exhibiting excellent heat generation characteristics.

Ninth, there is an effect of improving EMI performance.

Tenth, as the primary coil and the secondary coil only need to go down from the top to the bottom along the primary side outlet slits and the secondary side outlet slits to be assembled, the work of assembling the primary coil and the secondary coil may be performed very easily, conveniently, and accurately, and in addition, there is an effect in that a separate terminal alignment (wiring) work (wiring work) of the primary coil and the secondary coil is not required. As a result, assembly workability and product productivity can be improved.

Eleventh, there is an effect of easily, conveniently, and firmly fastening the cover to the housing with a simple configuration.

Twelfth, there is an effect in that even an unskilled worker may quickly and accurately wire the OBC transformer without erroneous wiring in a wiring work.

Thirteenth, there is an effect of accurately, conveniently, and quickly performing the work of assembling the cover down to the housing, and preventing foreign matters from flowing into the housing.

Fourteenth, as the strength of the cover can be maintained although the cover is thin, there is an effect of reducing material costs and improving durability of the product.

Fifteenth, there is an effect of easily, conveniently, and accurately performing the work of aligning the primary coil and the secondary coil stacked in the vertical direction in the longitudinal direction, while insulating between the primary coil and the secondary coil or between the secondary coil and the secondary coil.

Sixteenth, there is an effect of performing a work of wiring the transformer 100 with other components in the OBC more easily and conveniently.

Seventeenth, there is an effect of exhibiting performance of high current and high voltage with optimal thickness and an optimal number of copper fine lines.

Eighteenth, there is an effect of preventing occurrence of looseness or a gap between the primary coil and the secondary coil themselves although there is continuous vibration during the operation of an electric vehicle, and in addition, there is an effect of preventing occurrence of looseness or a gap between the primary coil and the secondary coil, and protecting from the risk of fire.

The preferred embodiments according to the present invention have been reviewed as described above, and it is self-evident to those skilled in the art that the present invention can be implemented in other specific forms, in addition to the embodiments described above, without changing the technical spirit or essential characteristics. Therefore, the embodiments described above should be understood as being illustrative rather than restrictive.

The scope of the present invention is indicated by the following claims, rather than the above detailed description, and all changes or modifications derived from the meaning and scope of the claims and equivalent concepts thereof should be construed as being included in the scope of the present invention.

What is claimed is:

1. A transformer for an on-board charger (OBC) of an electric vehicle, the OBC configured to charge a high voltage battery of the electric vehicle using commercial AC power supplied from a charger for the electric vehicle, the transformer comprising:

a housing having a storage space formed therein;

a cover for opening and closing the storage space of the housing;

a plate-shaped primary coil embedded in the storage space of the housing and configured to receive the commercial AC power supplied from the charger for the electric vehicle;

a plurality of plate-shaped secondary coils embedded in the storage space of the housing to independently generate induced current by magnetic field induction from the plate-shaped primary coil and output the induced current to the high voltage battery;

an upper magnetic core surrounding an outer surface of the housing on a top side of the cover; and a lower magnetic core surrounding the housing on a bottom side of the housing, wherein the plate-shaped primary coil includes:

a first conductive wire;

a first input wire configured to be connected to the charger;

a primary side winder extending from the first input wire and winding the first conductive wire a plurality of times in a plate shape to have a first central hole at a center of the first conductive wire wound in the plate shape; and a first output wire configured to be connected to the charger at an end of the primary side winder, wherein, in the primary side winder, the first conductive wire is coated with an insulative coalescing agent, and the first conductive wire is wound in the plate shape such that portions of the first conductive wire are adhered to each other by the coated coalescing agent, wherein each of the plurality of plate-shaped secondary coils includes:

a second conductive wire;

a second input wire configured to be connected to the charger;

a secondary side winder extending from the second input wire and winding the second conductive wire a plurality of times in the plate shape to have a second central hole at the center of the plate shape; and a second output wire configured to be connected to the charger at an end of the secondary side winder, wherein, in the secondary side winder, the second conductive wire is coated with the insulative coalescing agent, and the second conductive wire is wound in the plate shape such that portions of the second conductive wire are adhered to each other by the coated coalescing agent.

2. The transformer according to claim 1, wherein the portions of the first conductive wire are aligned with each other, and the portions of the second conductive wire are aligned with each other.

3. The transformer according to claim 2, wherein the first conductive wire includes a copper fine line twisted wire having several strands of copper fine lines, and the second conductive wire includes a copper fine line twisted wire having twisting several strands of copper fine lines.

4. A transformer for an on-board charger (OBC) of an electric vehicle, the OBC configured to charge a high voltage battery of the electric vehicle using commercial AC power supplied from a charger for the electric vehicle, the transformer comprising:

a housing having a storage space formed therein;

a cover for opening and closing the storage space of the housing;

a plate-shaped primary coil embedded in the storage space of the housing and configured to receive the commercial AC power from the charger;

a plurality of plate-shaped secondary coils embedded in the storage space of the housing to independently generate induced current by magnetic field induction from the plate-shaped primary coil and output the induced current to the high voltage battery;

an upper magnetic core surrounding an outer surface of the housing on a top side of the cover; and a lower magnetic core surrounding the housing on a bottom side of the housing, wherein the plate-shaped primary coil includes:

a first conductive wire;

a first input wire configured to be connected to the charger for the electric vehicle;

a primary side winder extending from the first input wire and winding the first conductive wire a plurality of times in a plate shape to have a first central hole at a center of the first conductive wire wound in the plate shape; and a first output wire configured to be connected to the charger at an end of the primary side winder, wherein a heat-resistant tape wraps around the first conductive wire, and a coalescing agent is coated on the heat-resistant tape wrapping the first conductive wire, and the first conductive wire is wound in the plate shape such that portions of the first conductive wire are are adhered to each other by the coalescing agent coated on the heat-resistant tape, and wherein each of the plurality of plate-shaped secondary coil includes:

a second conductive wire;

a second input wire configured to be connected to the charger for the electric vehicle;

a secondary side winder extending from the second input wire and winding the second conductive wire a plurality of times in the plate shape to have a second central hole at a center of the second conductive wire wound in the plate shape; and a second output wire configured to be connected to the charger at an end of the secondary side winder, wherein the heat-resistant tape wraps around the second conductive wire, and the coalescing agent is coated on the heat-resistant tape wrapping the second conductive wire, and the second conductive wire is wound in the plate shape such that portions of the second conductive wire are adhered to each other by the coalescing agent coated on the heat-resistant tape.

5. The transformer according to claim 1, wherein the primary coil is wound such that both the first input wire and the first output wire are disposed in the same direction toward the charger, the secondary coil is wound so that both the second input wire and the second output wire are disposed in the same direction, the housing further includes a bottom, a circumference unit disposed upright from the bottom toward a top of the housing, and an insertion tube disposed to protrude upward from the bottom, the storage space is formed by a space between the insertion tube and the circumference unit, the circumference unit includes a pair of primary side outlet slits on a left side thereof, wherein each of the pair of primary side outlet slits, having an open top while being recessed downward, is disposed to have an interval between the pair of primary side outlet slits, the circumference unit includes a pair of secondary side outlet slits on a right side thereof, wherein each of the pair of secondary side outlet slits, having an open top while being recessed downward, is disposed to have an interval between the pair of secondary side outlet slits, the plate-shaped primary coil forming the first central hole is disposed outside the insertion tube and is disposed between the circumference unit and the insertion tube, and the first input wire and the first output wire respectively penetrate one of the pair of primary side outlet slits, and each of the plate-shaped secondary coil forming the second central hole is disposed outside the insertion tube and is disposed between the circumference unit and the insertion tube, and the second input wire and the second output wire respectively penetrate one of the pair of secondary side outlet slits.

6. The transformer according to claim 5, further comprising:

a first guide channel disposed on the left side of the circumference unit and between the pair of primary side outlet slits, and recessed in a direction toward the center of the plate-shaped primary coil or each of the plate-shaped secondary coil;

a second guide channel disposed on the right side of the circumference unit and between the pair of secondary side outlet slits, and recessed in the direction toward the center of the plate-shaped primary coil or each of the plate-shaped secondary coil;

a first latching step disposed in the first guide channel and having a protrusion toward an inside thereof;

a second latching step disposed in the second guide channel and having a protrusion toward an inside thereof;

a first hook disposed at a left end of the cover to be perpendicular downward and hooked with the first latching step while descending along the first guide channel; and a second hook disposed at a right end of the cover to be perpendicular downward and hooked with the second latching step while descending along the second guide channel.

7. The transformer according to claim 6, further comprising:

a first guide slope surface disposed in the first guide channel and above the first latching step, and having a width inclined to decrease from a top of the first guide slope surface to a bottom of the first guide slope surface such that the first hook is hooked with the first latching step; and a second guide slope surface disposed in the second guide channel and above the second latching step, and having a width inclined to decrease from a top of the second guide slope surface to a bottom of the second guide slope surface such that the second hook is hooked with the second latching step.

\* \* \* \* \*